2 Sheets--Sheet 1.

P. BALL & B. FITTS.

Liquid-Meters.

No. 5,806. Reissued March 24, 1874.

Witnesses:
D. G. Stuart
J. W. Knight

Inventors:
Phineas Ball
Benaiah Fitts
(per) S. Hannay
Attorney.

2 Sheets--Sheet 2.

P. BALL & B. FITTS.

Liquid-Meters.

No. 5,806.

Reissued March 24, 1874.

Witnesses:

D. G. Stuart

J. J. Knight

Inventors:

Phinehas Ball

Benaiah Fitts per

P. Hannay

Attorney.

UNITED STATES PATENT OFFICE.

PHINEHAS BALL AND BENAIAH FITTS, OF WORCESTER, MASS., ASSIGNORS TO THE UNION WATER-METER COMPANY, OF SAME PLACE.

IMPROVEMENT IN LIQUID-METERS.

Specification forming part of Letters Patent No. 109,372, dated November 22, 1870; reissue No. 5,806, dated March 24, 1874; application filed February 26, 1874.

*To all whom it may concern:*

Be it known that we, PHINEHAS BALL and BENAIAH FITTS, of Worcester, in the county of Worcester and State of Massachusetts, have invented certain new and useful Improvements in Liquid-Meters; and we do hereby declare the following to be a full, clear, and exact description of the invention, such as will enable others skilled in the art to which it pertains to make and use it, reference being had to the accompanying drawings, which form part of this specification.

Figure 1:
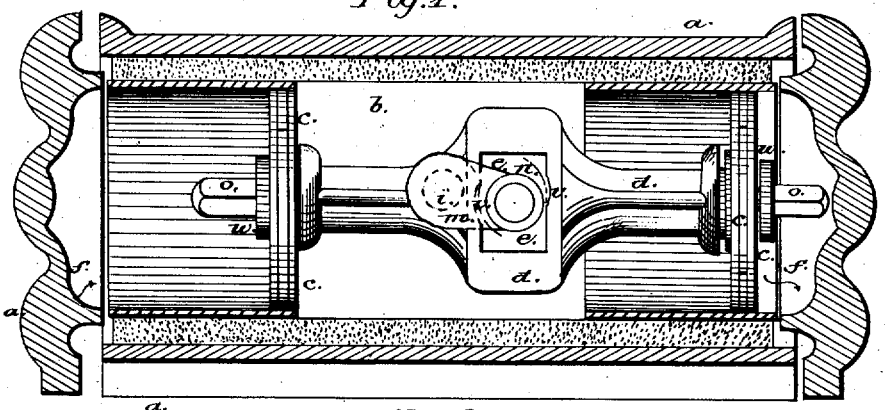
Figure 2:
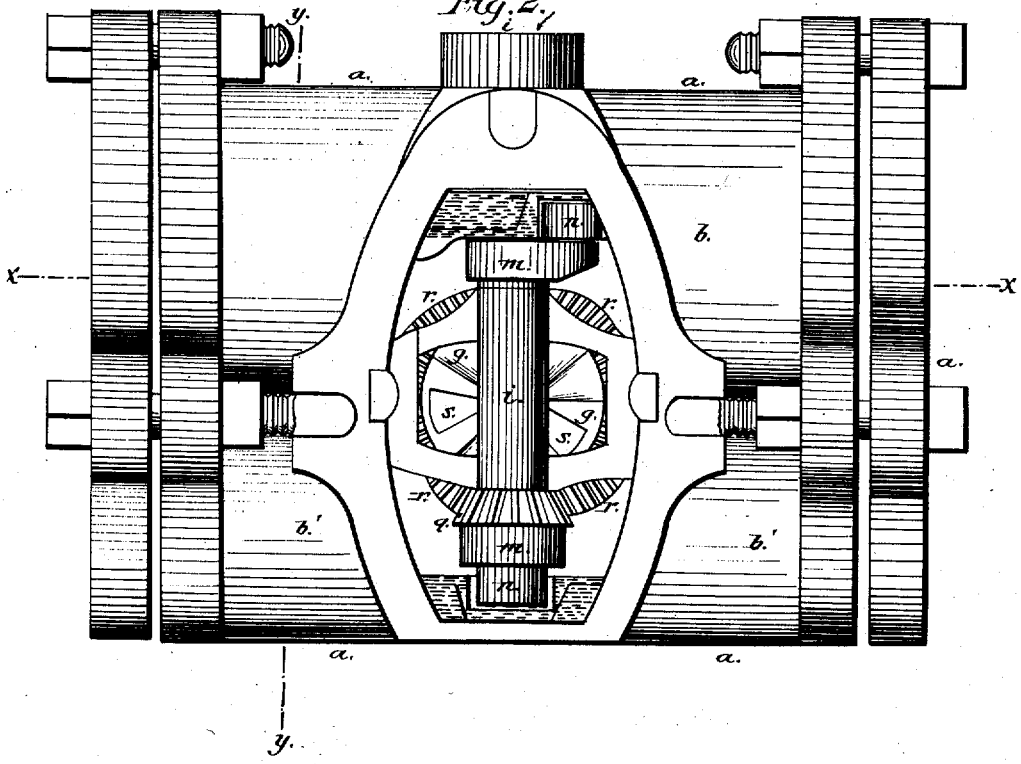
Figure 3:
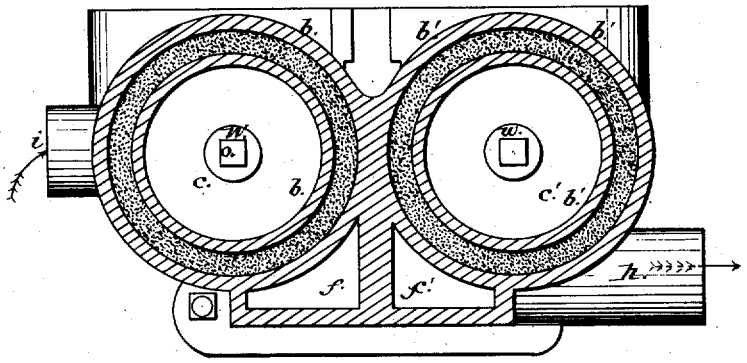
Figure 4:
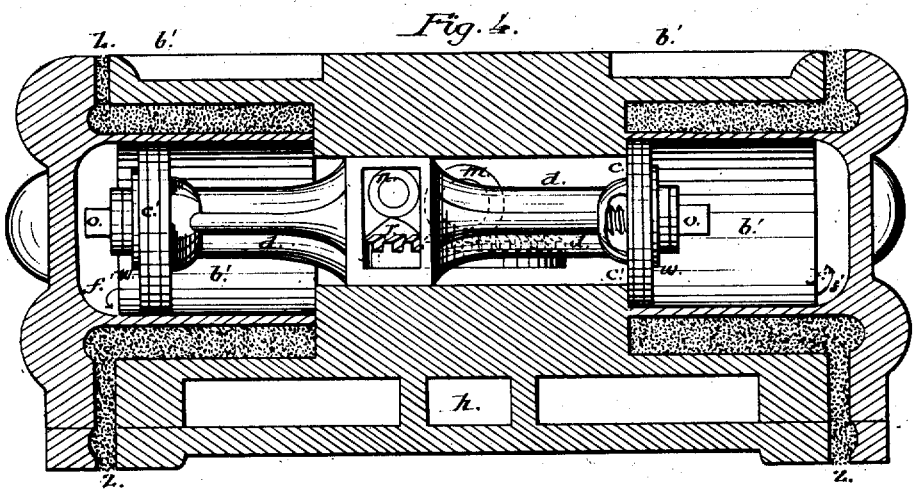

Figure 1 represents a plan of a meter having our improvements applied thereto, a portion of the machine being cut off on the line of its length on one side to show the operative parts. Fig. 2 represents a vertical longitudinal section of the same, taken through the line *x x* of Fig. 1, a portion of the parts, however, being shown in elevation; and Fig. 3, a cross-section through the line *y y* of the same figure. Fig. 4 represents a sectional elevation along the line of the machine cut-off in Fig. 1.

Our improvement relates to a new and improved mode of operating that class of water or fluid meters in which two or more cylinders, each provided with a reciprocating piston, are combined and used in connection with a single rotary valve, whose ports are common to the water-ways of the different cylinders.

Our invention consists, first, in combining, with a rotary valve and a crank-shaft to operate it, a double-acting piston, working in a cylinder suitably constructed to receive and discharge at each end the liquid to be measured, when said piston carries a rod provided with a single cam-slot, formed and arranged at an angle to the path of motion of the piston, for the actuation of the crank-shaft through which motion is imparted from the piston to the valve, as the former is moved back and forth under the pressure of the water being measured.

Our invention also consists in combining, with a rotary valve and a crank-shaft to operate it, two double-acting pistons, each working in a separate cylinder, and each carrying a rod provided with a cam-slot formed and arranged at an angle to the path of motion of the piston, for the actuation of the crank-shaft through which motion is imparted from the pistons to the valve, as the pistons move back and forth under the pressure of the water being measured.

Our invention further consists in combining, with a rotary valve and crank-shaft to operate it, and with a double-acting piston, adjusting-stops so arranged that when used in connection with a piston-rod provided with a cam-slot formed at an angle to the path of motion of the piston, and of a proper width, the said slot shall suffice to permit of the adjustment of the pistons, that the cylinders may discharge at each end alternately, neither more nor less than the exact quantity of water required; and shall also suffice, when the further advance of the piston shall have been thus arrested by the stops, to permit the crank to turn without acting on, or being acted on by, its own piston, as, for instance, when its crank-shaft is acted on by the adjoining piston for the purpose of opening the ports to the other sides of the piston just stopped, and which it otherwise could not do were the slot not widened sufficiently for that purpose.

Our improvement also consists in modifying the form of the widened slot in the piston-rods, by providing it on either side, at or near its middle, with a curved depression or cavity, that the following results or operations may be obtained, to wit: First, that each piston may be stopped a little before its valve-ports quite close, and yet allow its crank and crank-pin to be turned over past their dead-center without acting on, or being acted on by, its own piston by the action of the adjoining piston, and so that the latter, in thus turning the crank, may also move the valve over and open its ports to the other sides of the piston just stopped, and that before the crank-pin of the latter piston has reached the point at which, under the action of the other piston, it would compel its own piston to move, thereby preventing the one piston from compelling the other to move while its valve-ports are closed; secondly, that the piston just stopped, when moving on its return stroke, may sooner re-enforce the adjoining piston in its action on the crank-shaft, that the motion of the valve and piston may be more uniform and even, the re-enforcement coming at the time most required—that is to say, at the point at which the crank of the then actuating piston nears its dead-center, and consequently at the point in which the cam-slot exerts the least power on it.

To enable others skilled in the art to make, construct, and use our improved meter, we will now proceed to describe it in detail, omitting a particular description of such parts of the meter as are unnecessary to a full and perfect understanding of our present improvements.

Our improvements are represented as being applied to a meter having an outside casing, *a*, in which are arranged four short sectional or auxiliary cylinders set in cement, *z*. These cylinders are arranged side by side, in pairs, each pair being concentric, the one with the other, so as to form a single working cylinder, *b* or *b'*. Each sectional cylinder is provided with a piston; and the two pistons of each concentric pair of cylinders are so connected together by means of a piston-rod, *d*, as to form a single double-acting piston, *c* or *c'*. Each of the piston or connecting rods *d* is provided with a slot, *e*, into which the wrist-pin *n* of the crank *m* of the shaft *i*, that operates the valve *g*, projects and moves. It will be seen, first, that we make the general width of the slot *e* somewhat greater than the diameter of the wrist-pin *n*; and, secondly, that its width is still further enlarged on each side, at or near its center, as shown at *v*, being the points necessary to allow the crank to turn freely over after the piston has been stopped. This form is deemed better than where the slot is made of an equal width throughout its length; for, as the distance between the straight portions of the slot is less than between the curved portions, and as it at that point is so made as to be still sufficiently wide to allow the crank to be turned far enough over to open the valve-ports in reverse order to the other sides of the piston without acting on the piston so as to cause it to move on its return stroke before its valve-ports are open it, being less wide, enables the piston on its return stroke sooner to re-enforce the other piston in turning the crank-shaft than it would were it of uniform width throughout its length. The shaft *i* is provided with two cranks, *m*, and crank-pins *n*, one of each for each connecting-rod *d* and piston *c* or *c'*; it also carries a bevel-pinion, *q*, which meshes with a bevel-gear, *r*, formed on, or otherwise secured to, the valve *g*, and thereby imparts rotary motion to the latter, as it itself is turned by the action of the pistons as they are moved back and forth, through the medium of rods *d*, slots *e*, cranks *m*, and crank-pins *n*, under the pressure of the water. The valve *g* is provided with ports, as well for the induction of the liquid to be measured as for the discharge of the same, and which, for this purpose, communicate with suitable channels *f f'*, leading to the interior of the measuring-cylinders *b b'* on the side of the pistons next the stops *o*. *s s* represent the induction-ports; the eduction-ports are not shown in the drawings, nor is such deemed necessary, as the rotary valve itself may be of any suitable construction so long as it is provided with the necessary ports through the channels *f* and *f'* to supply the liquid to and discharge it from the cylinders when measured. The measured liquid escapes from the machine through the channel *h*, while the water to be measured is fed into the machine through the channel *i*. Each end of the pistons *c* and *c'* is provided with an adjusting-stop, *o*, with a view of abutting, at the end of each stroke, against the inner face of the cylinder-head, or head of the outer casing. A projecting point, *o'*, is represented as being formed on the casing for this purpose. These stops are for the purpose of adjusting the length of the stroke of the piston, so that each cylinder shall discharge, alternately, for each stroke of its double-acting piston, as nearly as possible, a given quantity of water, and no more; and, in addition to this, we so arrange the crank and valve-ports, with relation to each double-acting piston, that the latter will reach the end of its stroke, and be arrested by the stop *o*, before its valve-ports quite close. Thus arrested, the other double-acting piston, through its crank, and which is set at an angle of ninety degrees to the other, or thereabout, then moves the valve over, and opens its ports, but in reverse order to the other side of the piston just stopped, before the crank-pin of the latter reaches the point at which it would compel its own piston to move; thus, in no case, allowing the one double-acting piston to force the other to move while its valve-ports are closed. This peculiar movement of the crank and valve we obtain through the agency of the widened slot. The rotary valve *g* and its ports are common to the four channels or water-ways which lead to and from the four ends of the two cylinders *b* and *b'*, and which serve alternately to charge and discharge each end of these cylinders, and, in so doing, to move the pistons *c* and *c'*, and their respective rods *d d'*, back and forth—first moving the one, then the other, and afterward reversing the first, and then the other, and so on alternately and successively. Two of these water-ways are shown at *f* and *f'* in Fig. 3, the one, *f*, communicating with the one end of cylinder *b*, at the point shown by the arrows in Fig. 2, and the other, *f'*, communicating with the other cylinder, *b'*, as shown by the arrows in Fig. 4; the two other corresponding water-ways of these cylinders being arranged at their other end, and respectively marked *f* and *f'* in Figs. 2 and 4. These channels, according as the valve is moved, are, through it, alternately brought into communication with the supply-pipe *i* and discharge-pipe *h* of the meter. The discharge-pipe for this purpose is so arranged as to communicate, through a suitable opening, with the eduction-ports of the valve *g*. Each of the four water-ways *f f* and *f' f'* is separate and distinct, the one from the other, and all so arranged, as before stated, as to communicate with the ports of the rotary valve, according as the latter is turned.

The adjustment of the length of stroke of the pistons, in order to discharge a given quantity of water, is effected by interposing a greater or less number of washers, *w*, between the pistons and the adjusting-stops, as indicated in the drawings; or washers of different thickness may be used. When the proper thickness is attained, the stops are then screwed up tight.

Having thus described our invention, what we claim as new, and desire to secure by Letters Patent, is—

1. The combination, in a liquid-meter, of the following instrumentalities, to wit: A rotary valve, *g*, provided with suitable ports or openings, through which the liquid to be measured can be supplied to the meter and discharged therefrom; a cylinder, *b* or *b'*, for the reception and measurement of the liquid; and a double-acting piston, *c* or *c'*, carrying a rod, *d*, said rod being provided with a single cam-slot, *e*, arranged as described, through which and a crank-shaft, *i*, rotary motion is communicated to the valve, for the purposes set forth.

2. The combination, in a liquid-meter, of the following instrumentalities, to wit: A rotary valve, *g*, provided with suitable ports or openings, through which the liquid to be measured can be supplied to the meter and discharged therefrom; the cylinders *b* and *b'*, for the reception and measurement of the liquid; and two double-acting pistons, *c* and *c'*, each carrying a rod, *d*, and each of said rods provided with a single cam-slot, *e*, arranged as described, through which and a crank-shaft, *i*, rotary motion is imparted to the valve, in the manner and for the purposes substantially as set forth.

3. The combination, in a liquid-meter, of the following instrumentalities, to wit: A rotary valve, *g*, provided with suitable ports or openings, through which the liquid to be measured can be supplied to the meter and discharged therefrom; a cylinder, *b* or *b'*, for the reception and measurement of the liquid; a double-acting piston, *c* or *c'*, carrying a rod, *d*, provided with a single cam-slot, *e*, arranged as described, and of a width greater than the diameter of the wrist *n* of the crank-shaft, to permit of the adjustment of the length of stroke of the piston, that it may discharge at each stroke, as nearly as possible, a given quantity of water, and to permit its crank-wrist freely to pass the dead-center after its own piston has ceased to act upon it; adjusting-stops *o*, by means of which the adjustment of the length of stroke of the piston at either end is effected; and, lastly, of a crank-shaft, *i*, through which motion from the piston is imparted to the valve, the whole operating in the manner substantially as described.

4. The combination, in a liquid-meter, of the following instrumentalities, to wit: A rotary valve, *g*, provided with suitable ports or openings, through which the liquid to be measured can be supplied to the meter and discharged therefrom; two cylinders, *b* and *b'*, for the reception and measurement of the liquid; the double-acting pistons *c* and *c'*, each carrying a rod, *d*, and each of these provided with a single cam-slot, *e*, arranged as described, and of a width greater than the diameter of the wrist *n* of the crank-shaft, so as to permit of the adjustment of the pistons that they may discharge at each stroke, as nearly as possible, the exact quantity of water required of them, and so as to allow each of the crank-wrists *n* freely to pass its dead-center after its own piston has ceased to act on it; adjusting-stops *o*, by means of which the adjustment of the length of the stroke of the pistons at either end is effected; and, lastly, a crank-shaft, *i*, through which motion from the pistons is imparted to the valve, the whole operating in the manner substantially as described.

5. The combination, in a water or liquid meter, of a piston-carrying connecting-rod, *d*, having a cam-slot, *e*, formed as shown—that is to say, at an angle to the path of motion of the rod and piston, and of a width greater than the diameter of the wrist *n* of the crank, which moves in and is actuated by it—with adjusting-stops *o*, for the purpose set forth.

6. The combination, in a water or liquid meter, of two double-acting pistons, *c* and *c'*, and of their respective rods *d d*, each of the latter being provided with a cam-slot, *e*, formed as shown—that is to say, at an angle to the path of motion of the piston and rod, and of a width greater than the diameter of the wrist *n* of the crank, which moves in and is actuated by it—with a crank-shaft, *i*, and adjusting-stops *o*, so that each of the pistons may be independently adjusted without interfering with the motion of the other, substantially as set forth.

7. In a water or liquid meter, a piston-carrying connecting-rod, *d*, provided with a single slot, *e*, arranged as described, and used in connection with adjusting-stops *o*, shaft *i*, crank *m*, and crank-pin *n*, for the purpose set forth.

8. In a water or liquid meter, a piston-carrying rod, *d*, having a slot, *e*, formed as shown—that is to say, with a concavity, *v*, on each side, at or near its middle, and used in connection with a crank-shaft, for the purpose set forth.

In testimony that we claim the foregoing we have hereunto set our hands and seals this 2d day of February, 1874.

PHINEHAS BALL. [L. S.]
BENAIAH FITTS. [L. S.]

Witnesses:

ABIEL E. WILSON,
JONAS HEALD.